(12) United States Patent
Cao et al.

(10) Patent No.: US 11,269,175 B2
(45) Date of Patent: Mar. 8, 2022

(54) EYEPIECE OPTICAL SYSTEM AND DEVICE WITH LARGE FIELD-OF-VIEW ANGLE AND HIGH IMAGE QUALITY

(71) Applicant: Shenzhen Nade Optical Co., Ltd, Guangdong (CN)

(72) Inventors: Hongpeng Cao, Guangdong (CN); Jianfei Guo, Guangdong (CN); Huajun Peng, Guangdong (CN)

(73) Assignee: Shenzhen Nade Optical Co., Ltd, Shenzhen (CN)

( * ) Notice: Subject to any disclaimer, the term of this patent is extended or adjusted under 35 U.S.C. 154(b) by 0 days.

(21) Appl. No.: 17/157,984

(22) Filed: Jan. 25, 2021

(65) Prior Publication Data

US 2021/0157122 A1 May 27, 2021

Related U.S. Application Data

(63) Continuation of application No. PCT/CN2019/120967, filed on Nov. 26, 2019.

(51) Int. Cl.
*G02B 25/00* (2006.01)
*G02B 25/04* (2006.01)
*G02B 3/08* (2006.01)

(52) U.S. Cl.
CPC ............... *G02B 25/04* (2013.01); *G02B 3/08* (2013.01); *G02B 25/001* (2013.01)

(58) Field of Classification Search
CPC ........ G02B 25/04; G02B 3/08; G02B 25/001; G02B 2027/011; G02B 2027/0123; G02B 27/0172
See application file for complete search history.

(56) References Cited

U.S. PATENT DOCUMENTS

2016/0011341 A1* 1/2016 Smith ................... G02B 3/08
359/743

FOREIGN PATENT DOCUMENTS

| CN | 106526852 A | 3/2017 |
| CN | 106773008 A | 5/2017 |

* cited by examiner

*Primary Examiner* — James C. Jones

(57) ABSTRACT

The present invention relates to an eyepiece optical system and device with a large field-of-view angle and high image quality, comprising a first lens group and a second lens group arranged successively along an optical axis from a human eye observing side to a micro display. The first lens group is composed of one or more lenses, and the second lens group comprises a Fresnel lens. The Fresnel lens comprises a Fresnel surface. By the use of a combination of a novel optical surface shape, i.e., the Fresnel surface shape, and traditional optical spherical and aspherical surface shapes, when focal lengths of various lenses and lens groups meet particular conditions, significant elimination of system aberration, reduction of the sensitivity of various optical components, and easy processing and assembly of the components can be achieved.

10 Claims, 15 Drawing Sheets

EYEPIECE OPTICAL SYSTEM AND DEVICE WITH LARGE FIELD-OF-VIEW ANGLE AND HIGH IMAGE QUALITY

CROSS REFERENCE TO RELATED APPLICATIONS

The present application is a Continuation Application of PCT Application No. PCT/CN2019/120967 filed on Nov. 26, 2019, the contents of which are incorporated herein by reference in their entirety.

TECHNICAL FIELD

The present invention relates to an optical system of a head-mounted display device, and more particularly, to an eyepiece optical system and device with a large field-of-view angle and high image quality.

BACKGROUND

With the development of electronic devices to ultra miniaturization and the development of new computers, microelectronics, optoelectronics devices, and communications theories and technologies, a new mode such as wearable computing based on "people-oriented" and "unity of man and machine" has become possible, and is emerging in military, industrial, medical, educational, consumption and other fields. In a typical wearable computing architecture, a head-mounted display device is a key component. The head-mounted display device directs the video image light emitted from a micro image display (e.g., a transmissive or reflective liquid crystal display, an organic electroluminescent device, or a DMD device) to the pupil of a user by the optical technology, for implementing virtual magnified images in the near-eye range of the user, so as to provide the user with intuitive, visual images, video, and text information. The eyepiece optical system is the core of the head-mounted display device, which realizes the function of displaying a miniature image in front of human eyes to form a virtual magnified image.

The head-mounted display device develops toward having compact size, light weight, convenient wearing, reduced load, and the like. Meanwhile, a large field-of-view angle and visual comfort experience have gradually become key factors to evaluate the quality of the head-mounted display device. The large field-of-view angle determines a visual experience effect of high liveness, and high image quality and low distortion determine the comfort of visual experience. To meet these requirements, the optical system should try its best to achieve such indexes as a large field-of-view angle, high image resolution, low distortion, small field curvature, and a small volume. It is a great challenge for system design and aberration optimization to achieve the above optical properties at the same time.

SUMMARY

The technical problem to be solved by the present invention is that the existing optical structure has poor image quality, distortion and a small field-of-view angle. Aiming at the above defects of the prior art, an eyepiece optical structure, system, and device are provided.

The technical solution adopted by the present invention to solve its technical problems is: adopting a creative and rational combination of a novel Fresnel surface shape and traditional spherical and aspherical surface shapes to construct an eyepiece optical system with a large field-of-view angle, high image quality, and easy processing.

An eyepiece optical system with a large field-of-view angle and high image quality is constructed, comprising a first lens group and a second lens group arranged successively along an optical axis from a human eye observing side to a micro display, wherein the first lens group is composed of one or more lenses, the second lens group comprises a Fresnel lens, and the Fresnel lens comprises a Fresnel surface;

a range of the Fresnel surface from the center to the edge can be divided into N sections, wherein the frequency in the $n^{th}$ section is fn, and N and n meet the following relations (1) and (2):

$$N \geq 1 \quad (1);$$

$$1 \leq n \leq N \quad (2);$$

the focal length of the Fresnel lens is F4, the total focal length of the optical system is F, and F4 and F meet the following relationship (3):

$$0.3 \leq |F4/F| \quad (3).$$

As a further solution of the present invention, the clear aperture of the Fresnel lens is D4, and D4 and F4 meet the following relationship (4):

$$|D4/F4| \leq 2.5 \quad (4).$$

As a further solution of the present invention, the distance from an optical surface of one side of the Fresnel lens close to the micro display to the micro display is fd, and fd and F meet the following relationship (5):

$$0.05 \leq fd/F \leq 1.0 \quad (5).$$

As a further solution of the present invention, the F4 and F further meet the following relation (6):

$$0.3455 \leq |F4/F| \quad (6).$$

As a further solution of the present invention, the D4 and F4 further meet the following relation (7):

$$|D4/F4| \leq 2.05 \quad (7).$$

As a further solution of the present invention, the fd and F further meet the following relation (8):

$$0.095 \leq fd/F \leq 0.89 \quad (8).$$

As a further solution of the present invention, lenses of the first lens group and the second lens group are made of glass materials or plastic materials.

As a further solution of the present invention, the Fresnel lens further comprises a common optical surface, and the common optical surface is in a plane, spherical, or aspherical surface shape.

As a further solution of the present invention, the surface shape of each lens in the first lens group is a spherical surface shape, an even-order aspherical surface shape, or a Fresnel surface shape, and there is at least one axisymmetric aspherical lens in the first lens group and the second lens group.

An eyepiece optical device with a large field-of-view angle and high image quality is further provided in the present invention, comprising two micro display devices corresponding to positions of left and right eyes of a human, respectively, and further comprising the optical system according to any of the above description, wherein the optical system is arranged at a position between the human eye and the micro display device, for projecting a picture displayed by the micro display device into the human eye with the characteristics of high image quality, low distortion, and large field-of-view angle.

The present invention has the following beneficial effects: the present invention adopts a combination of a novel Fresnel surface shape and traditional optical spherical and aspherical surface shapes, and therefore, when focal lengths of various lenses and lens groups meet particular conditions, significant elimination of system aberration, reduction of the sensitivity of various optical components, and easy processing and assembly of the components can be achieved. Especially, optical indexes such as a large field-of-view angle, low distortion, low chromatism, low field curvature, and low astigmatism can be achieved at the same time, thus an observer can watch large pictures of full frame, high definition and uniform image quality without any distortion and get visual experience of high liveness via the eyepiece optical system according to the present invention.

BRIEF DESCRIPTION OF THE DRAWINGS

In order to more clearly illustrate the embodiments of the present invention or the technical solutions in the prior art, the present invention is further illustrated with reference to the embodiments and accompanying drawings. The accompanying drawings in the following description are only some embodiments of the present invention. For those of ordinary skill in the art, other accompanying drawings may be obtained according to these accompanying drawings without creative efforts.

DETAILED DESCRIPTION OF THE PREFERRED EMBODIMENT

In order to clarify the objects, technical solutions and advantages of the embodiments of the present invention, the following clear and complete description will be made for the technical solution in the embodiments of the present invention. Apparently, the described embodiments are just some rather than all embodiments of the present invention. All other embodiments obtained by those of ordinary skill in the art without creative efforts based on the embodiments disclosed in the present invention fall into the protection scope of the present invention.

Figure 1:
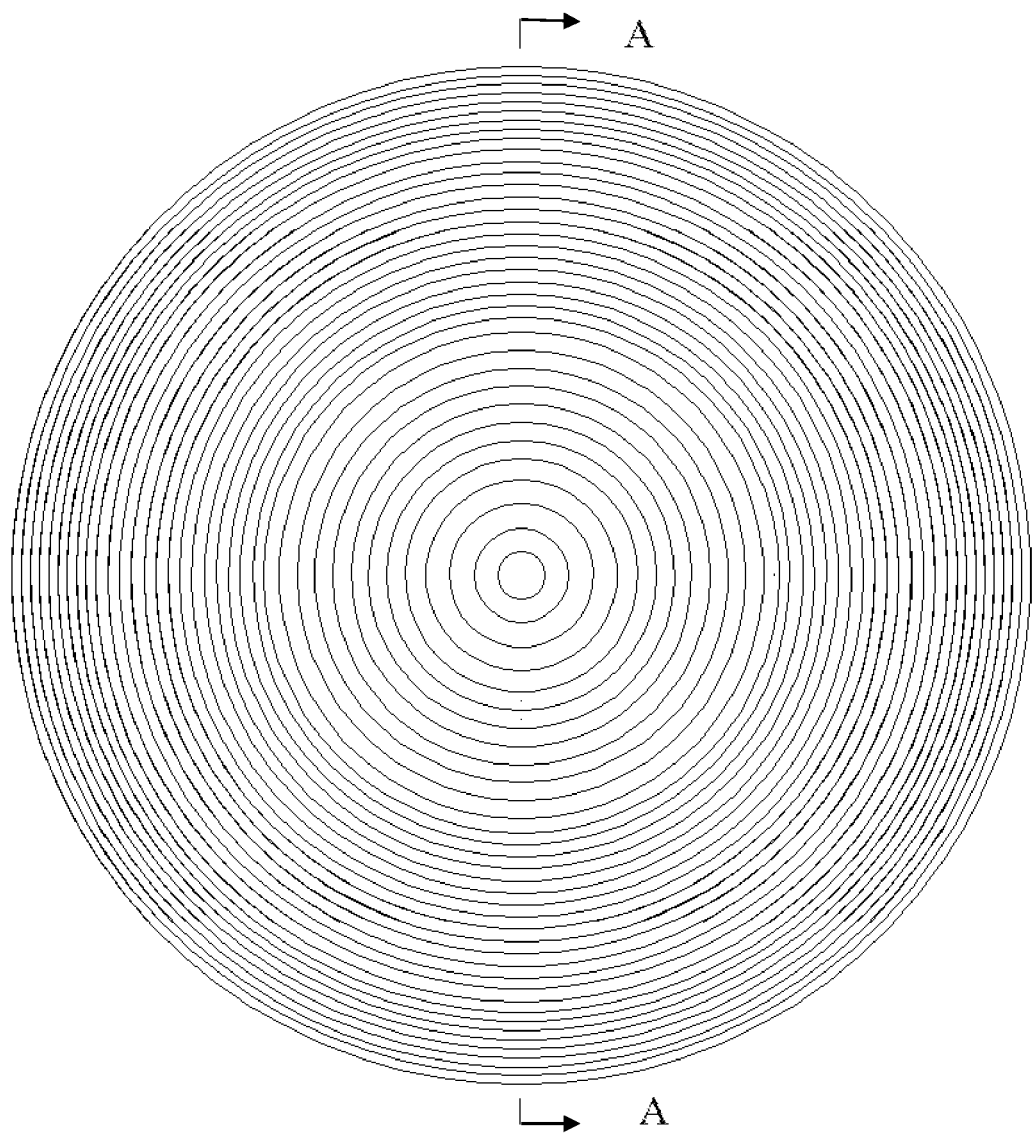
FIG. 1 is a schematic diagram of the surface shape of a Fresnel surface according to the present invention.
Figure 2:
FIG. 2 is an enlarged cross-sectional view at A-A in FIG. 1 according to the present invention.

An eyepiece optical system with a large field-of-view angle and high image quality according to the present invention is shown in FIG. 1 and FIG. 2. An eyepiece optical system with a large field-of-view angle and high image quality is provided, including a first lens group A1 and a second lens group A2 arranged successively along an optical axis from a human eye observing side to a micro display. The first lens group A1 is composed of one or more lenses, the second lens group A2 includes a Fresnel lens, and the Fresnel lens includes a Fresnel surface.

A range of the Fresnel surface from the center to the edge can be divided into N sections, wherein the frequency in the $n^{th}$ section is fn, and N and n meet the following relations (1) and (2):

$$N \geq 1 \qquad (1);$$

$$1 \leq n \leq N \qquad (2).$$

In the above relation (2), the value of n is 1, 2, 3, 4, 5, . . . , and N. The frequency fn in different sections may be different. As shown in Table 1, combined data of the Fresnel surface is as follows:

TABLE 1

Combination data of Fresnel surface

| Rim serial number | Position | Frequency (number of teeth/mm) | Draft angle | Number of sub-sections |
|---|---|---|---|---|
| No1-9 | R0-6 mm | 1.5 | 0° | 20 |
| No10-17 | R6-10 mm | 2.0 | 0° | 10 |
| No18-25 | R10-14 mm | 2.0 | 3° | 10 |
| No26-52 | R14-22 mm | 3.0 | 3° | 10 |
| No53-92 | R22-33 mm | 4.0 | 6° | 6 |

The focal length of the Fresnel lens is F4, the total focal length of the optical system is F, and F4 and F meet the following relationship (3):

$$0.3 \leq |F4/F| \qquad (3)$$

In the above relation (3), the value of |F4/F| may be 0.3, 0.3455, 1.193, 0.3479, 0.3787, 0.472, and 10.61.

In the above embodiments, a combination of a novel Fresnel surface shape and traditional optical spherical and aspherical surface shapes is adopted, and when focal lengths of various lenses and lens groups meet particular conditions, significant elimination of system aberration, reduction of the sensitivity of various optical components, and easy processing and assembly of the components can be achieved, and optical indexes such as a large field-of-view angle, low distortion, low chromatism, low field curvature, and low astigmatism can also be achieved.

In a further embodiment, the clear aperture of the Fresnel lens is D4, and D4 and F4 meet the following relation (4):

$$|D4/F4| \leq 2.5 \qquad (4).$$

In the above relation (4), the value of |D4/F4| may be 2.05, 0.073, 0.338, 0.45, 1.45, and 2.5.

In a further embodiment, the distance from an optical surface of one side of the Fresnel lens close to the micro display to the micro display is fd, and fd and F meet the following relationship (5):

$$0.05 \leq fd/F \leq 1.0 \qquad (5);$$

In the above relation (5), the value of fd/F may be 0.05, 0.095, 0.2, 0.355, 0.499, 0.87, 0.89, and 1.0.

In a further embodiment, F4 and F further meet the following relation (6):

$$0.3455 \leq |F4/F| \qquad (6).$$

In a further embodiment, D4 and F4 further meet the following relation (7):

$$|D4/F4| \leq 2.05 \qquad (7).$$

In a further embodiment, fd and F further meet the following relation (8):

$$0.095 \leq fd/F \leq 0.89 \qquad (8).$$

By further optimizing the value range of the effective focal length of the Fresnel lens, the optical performance and the manufacturing difficulty of the optical system are better balanced.

In a further embodiment, lenses of the first lens group A1 and the second lens group A2 are made of glass materials or plastic materials, so that the various levels of aberrations of the eyepiece optical system are corrected, and at the same time, the manufacturing cost of the optical element and the weight of the optical system are also controlled.

In a further embodiment, the Fresnel lens further includes a common optical surface, and the common optical surface is in a plane, spherical, or aspherical surface shape.

In a further embodiment, the surface shape of each lens in the first lens group A1 is a spherical surface shape, an even-order aspherical surface shape, or a Fresnel surface shape, and there is at least one axisymmetric aspherical lens in the first lens group A1 and the second lens group A2. A combination of the novel Fresnel surface shape and the traditional optical spherical and aspherical surface shapes is adopted, and when focal lengths of various lenses and lens groups meet particular conditions, significant elimination of system aberration, reduction of the sensitivity of various optical components, and easy processing and assembly of the components can be achieved, and optical indexes such as a large field-of-view angle, low distortion, low chromatism, low field curvature, and low astigmatism can also be achieved.

In the above embodiment, the expression of the aspherical surface is $$z = \frac{cr^2}{1 + \sqrt{1 - (1+k)c^2 r^2}} + \alpha_2 r^2 + \alpha_4 r^4 + \alpha_6 r^6 + \ldots$$

wherein, z denotes the vector height of the optical surface, c denotes the curvature at the apex of the aspherical surface, k denotes the coefficient of the aspherical surface, $\alpha_2, _4, _6 \ldots$ denote coefficients of each degree, and r denotes the distance coordinate from the point on the curved surface to the optical axis of the lens system.

The present invention will be further explained below with reference to the accompanying drawings and the specific embodiments: in light path diagrams of the following embodiments, the light emitted from the micro display passes through the Fresnel lens and the first lens group A1 successively, and then enters the human. The diaphragm may be the exit pupil of the eyepiece optical system imaging, and is a virtual exit aperture. When the pupil of the human eye EYE is at the diaphragm position, the best imaging effect can be observed.

Embodiment 1

Eyepiece design data of Embodiment 1 is shown in the following table:

TABLE 2

Eyepiece Design Data of Embodiment 1

| Surface | Curvature radius (mm) | Thickness (mm) | Glass Refractive index | Abbe number | Net caliber (mm) | Cone coefficient |
|---|---|---|---|---|---|---|
| Diaphragm | Infinite | 23 | | | 7.6 | 0 |
| 2 | 55.21 | 10.7 | 1.53 | 55.79 | 47 | −4.27 |
| 3 | −87.2 | 4.5 | | | 47 | 6 |

TABLE 2-continued

Eyepiece Design Data of Embodiment 1

| Surface | Curvature radius (mm) | Thickness (mm) | Glass Refractive index | Abbe number | Net caliber (mm) | Cone coefficient |
|---|---|---|---|---|---|---|
| 4 | 439 | 3.4 | 1.64 | 22.4 | 53 | 10.5 |
| 5 | 27.63 | 0.1 | | | 53 | −7.31 |
| 6 | 28.66 | 7.8 | 1.53 | 55.79 | 55 | −7.92 |
| 7 | 211.3 | 15 | | | 55 | 45.7 |
| 8 | 467 | 1.7 | 1.53 | 55.79 | 66 | −228 |
| 9 | −31.53 | 26.97 | | | 66 | −0.737 |
| Image plane | Infinite | | | | | |

Figure 3:
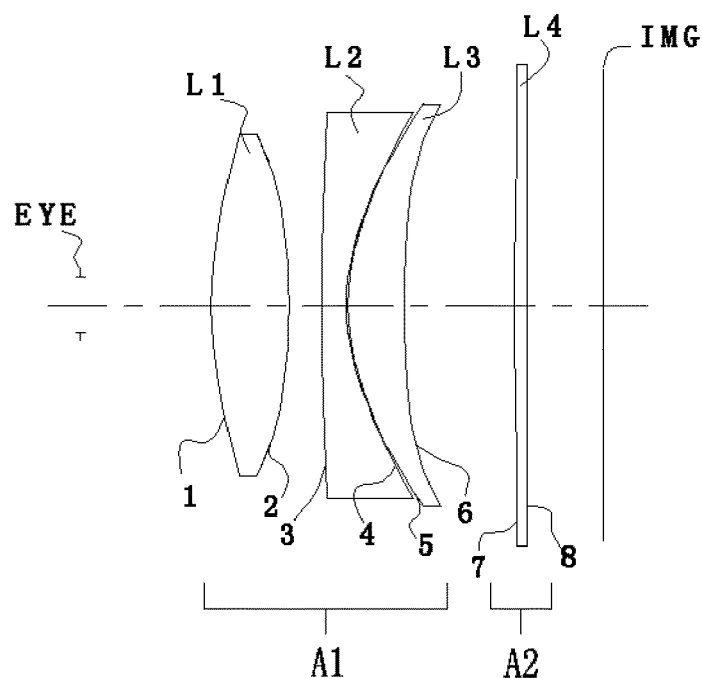
FIG. 3 is a schematic structural diagram of an eyepiece optical system according to Embodiment 1 of the present invention.

FIG. 3 is a 2D structural diagram of the eyepiece optical system according to Embodiment 1. The optical structure is composed of four optical lenses. The first lens group A1 is composed of a first lens L1, a second lens L2, and a third lens L3. The first lens L1 and the third lens L3 are positive lenses, and the second lens L2 is a negative lens. A first optical surface 1, a third optical surface 3, a fourth optical surface 4, a fifth optical surface 5, and a sixth optical surface 6 are in a spherical or aspherical surface shape convex toward the human eye, and a second optical surface 2 is in an even-order aspherical surface shape concave toward the human eye. The Fresnel lens in the second lens group A2 is L4, a seventh optical surface 7 is an even-order aspherical surface, and an eighth optical surface 8 is a Fresnel surface. The fourth-degree coefficient in parameters of the Fresnel surface of the eighth optical surface 8 is 1.57e-06, the sixth-degree coefficient is 6.9e-10, the eighth-degree coefficient is −7.75e-13, and the tenth-degree coefficient is 4.4e-16. The focal length of the Fresnel lens is F4, the clear aperture of the Fresnel surface is D4, the total focal length of the optical structure is F, and the distance from the eighth optical surface 8 to the micro display device is fd. |F4/F| is 1.193, |D4/F4| is 1.425, and fd/F is 0.605.

Figure 4:
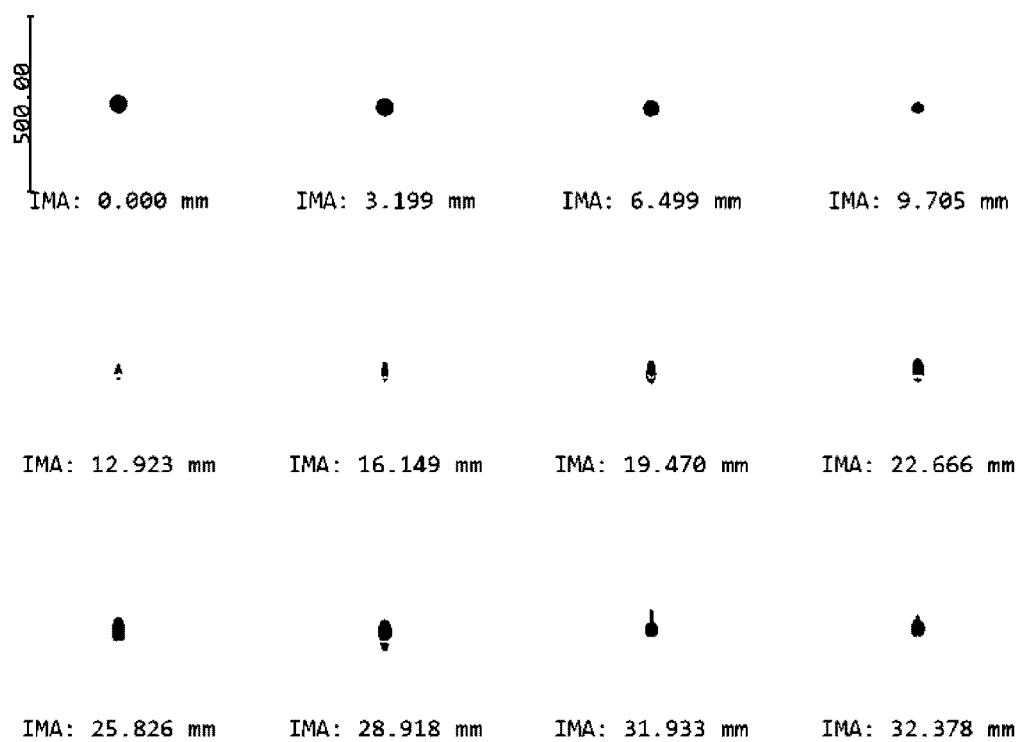
FIG. 4 is a schematic diagram of a dispersion spot array of the eyepiece optical system according to Embodiment 1 of the present invention.
Figure 5:
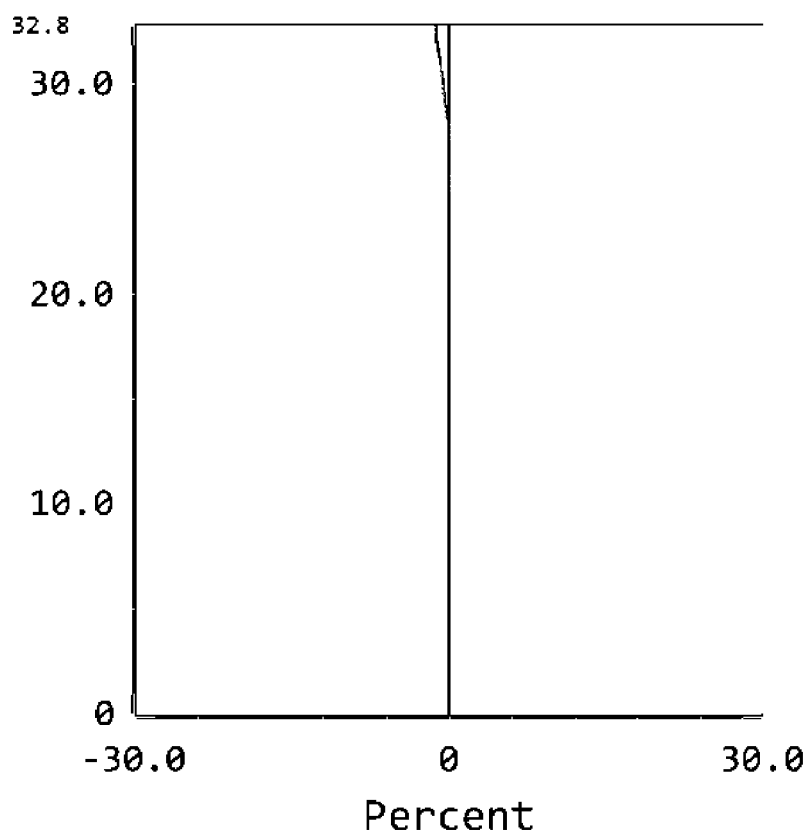
FIG. 5 is a schematic diagram of distortion of the eyepiece optical system of Embodiment 1 of the present invention.
Figure 6:
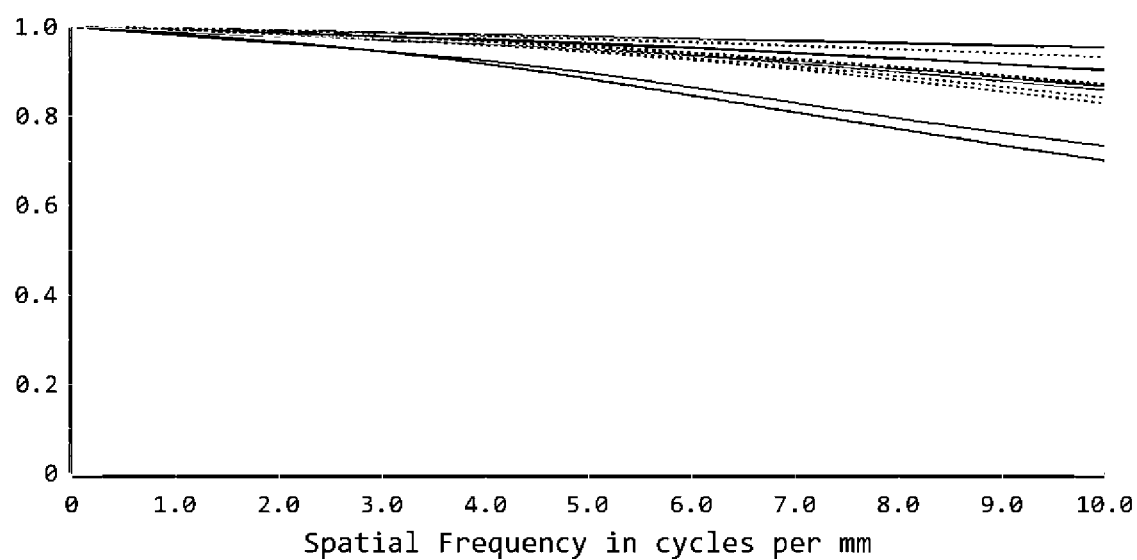
FIG. 6 is a schematic diagram of an optical transfer function (MTF) of the eyepiece optical system according to Embodiment 1 of the present invention.

FIG. 4, FIG. 5, and FIG. 6 are respectively a dispersion spot array diagram, a distortion diagram, and an optical transfer function (MTF) diagram of the optical system, reflecting that the light of each field of view of this embodiment in the unit pixel of an image plane (a display device I) has a high resolution and small optical distortion. The resolution per 10 mm per unit period is above 0.78, the aberration of the optical system is well corrected, and a displayed image with uniform and high optical performance can be observed through the eyepiece optical system.

Embodiment 2

Figure 7:
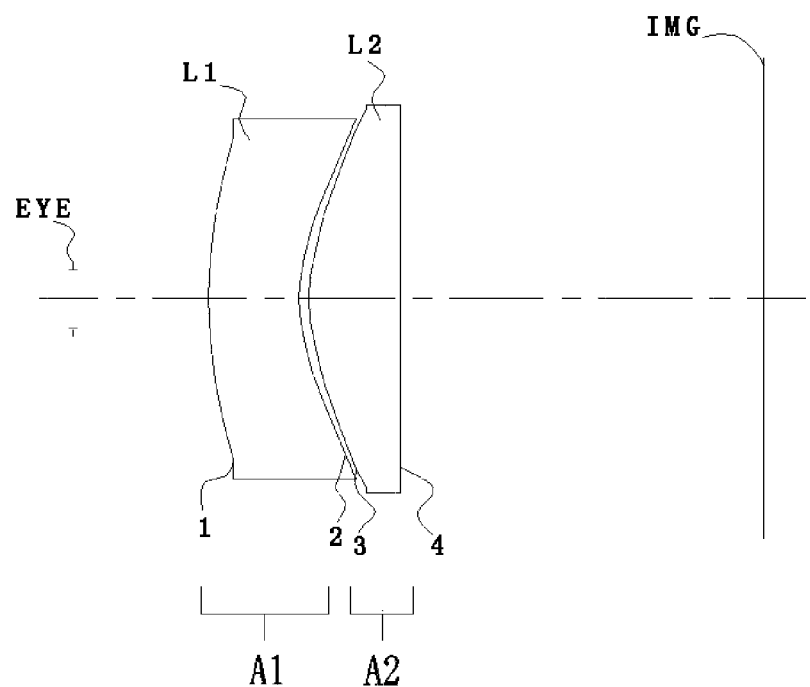
FIG. 7 is a schematic structural diagram of an eyepiece optical system according to Embodiment 2 of the present invention.

Eyepiece design data of Embodiment 2 is shown in the following table:

FIG. 7 is a 2D structural diagram of an eyepiece optical system according to Embodiment 2. Compared with Embodiment 1, the main characteristic of Embodiment 2 is that the optical structure is composed of two optical lenses. A first lens group A1 is composed of a first lens L1, and the first lens L1 is a negative lens. Surface shapes of a first optical surface 1 and a second optical surface 2 are even-order aspherical surface shapes convex toward the human eye. A Fresnel lens in a second lens group A2 is a second lens L2, a third optical surface 3 is an even-order aspherical surface, and a fourth optical surface 4 is a Fresnel surface. The fourth-degree coefficient in parameters of the Fresnel surface of the fourth optical surface 4 is −4.1467078e-05, the sixth-degree coefficient is 2.5702072e-07, the eighth-degree coefficient is −1.1292358e-09, and the tenth-degree coefficient is 2.4473554e-12. The focal length of the Fresnel lens is F4, the clear aperture of the Fresnel surface is D4, the total focal length of the optical structure is F, and the distance from the fourth optical surface 4 to the micro display device is fd. |F4/F| is 0.3479, |D4/F4| is 1.993, and fd/F is 0.941.

Figure 8:
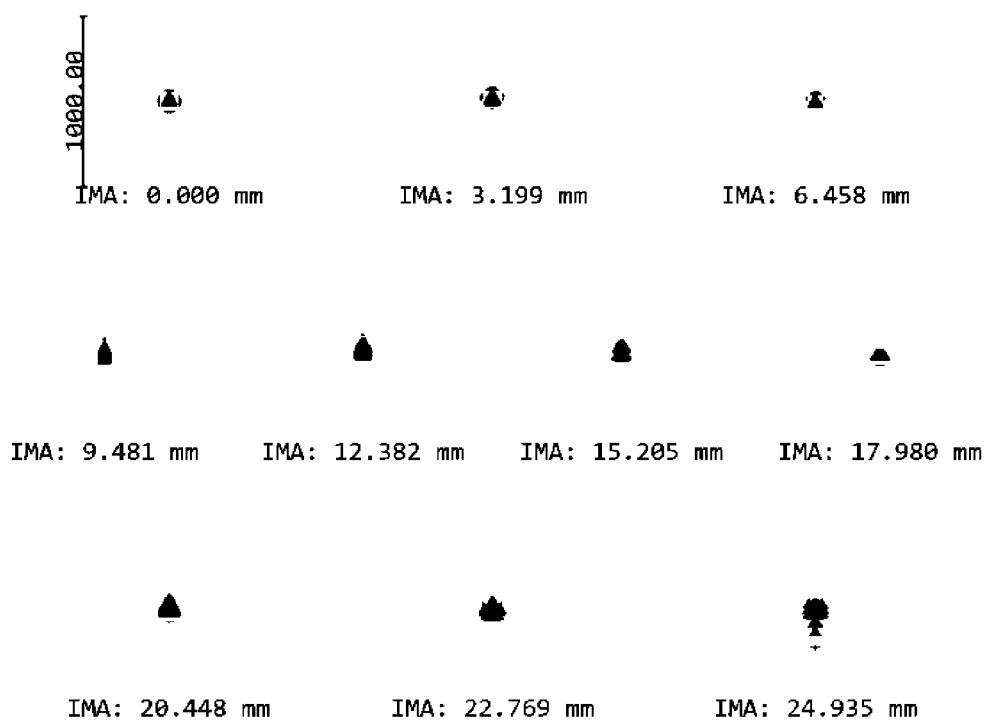
FIG. 8 is a schematic diagram of a dispersion spot array of the eyepiece optical system according to Embodiment 2 of the present invention.
Figure 9:
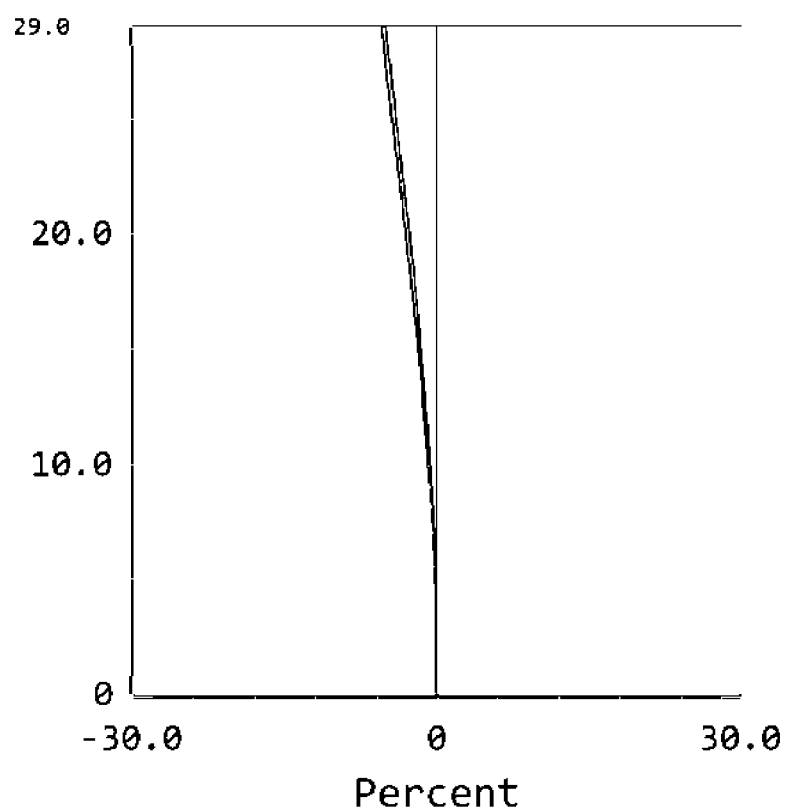
FIG. 9 is a schematic diagram of distortion of the eyepiece optical system according to Embodiment 2 of the present invention.
Figure 10:
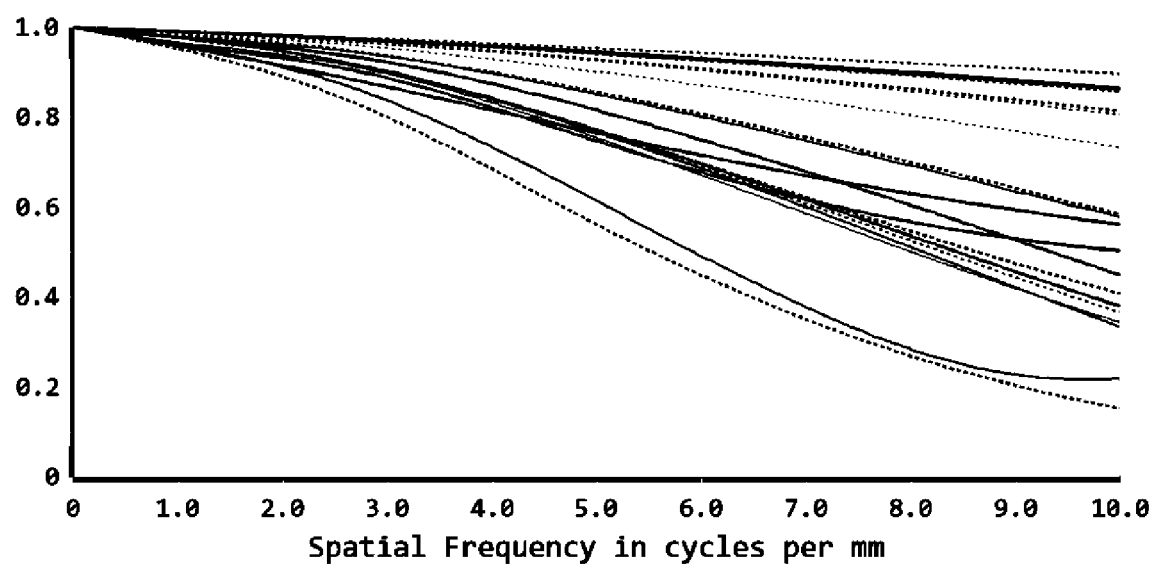
FIG. 10 is a schematic diagram of an MTF of the eyepiece optical system according to Embodiment 2 of the present invention.

FIG. 8, FIG. 9, and FIG. 10 are respectively a dispersion spot array diagram, a distortion diagram, and an MTF diagram of the optical system, reflecting that the light of each field of view of this embodiment in the unit pixel of an image plane (a display device I) has a high resolution and small optical distortion. The resolution per 10 mm per unit period is above 0.15, the aberration of the optical system is well corrected, and a displayed image with uniform and high optical performance can be observed through the eyepiece optical system.

Embodiment 3

Eyepiece design data of Embodiment 3 is shown in the following table:

TABLE 3

Eyepiece Design Data of Embodiment 2

| Surface | Curvature radius (mm) | Thickness (mm) | Glass Refractive index | Abbe number | Net caliber (mm) | Cone coefficient |
|---|---|---|---|---|---|---|
| Diaphragm | Infinite | 21.64 | | | 4 | 0 |
| 2 | 44.91 | 5.49 | 1.81 | 25.48 | 28.11 | 7.09 |
| 3 | 14.07 | 0.90 | | | 32.62 | −12.04 |
| 4 | 14.21 | 6.04 | 1.67 | 55.40 | 36.00 | −12.80 |
| 5 | −67.16 | 49.00 | | | 34.65 | 12.12 |
| Image plane | Infinite | | | | 49.95 | 0 |

TABLE 4

Eyepiece Design Data of Embodiment 3

| Surface | Curvature radius (mm) | Thickness (mm) | Glass Refractive index | Abbe number | Net caliber (mm) | Cone coefficient |
|---|---|---|---|---|---|---|
| STO | Infinite | 17.71 | | | 4 | 0 |
| 2 | −173.15 | 2.96 | 1.51 | 57.20 | 23.15 | 26.6987 |
| 3 | −52.02 | 18.53 | | | 23.24 | 0.28 |
| 4 | 69.99 | 2.00 | 1.64 | 23.29 | 37.55 | −21.28 |
| 5 | 15.06 | 0.50 | | | 41.82 | −30.00 |
| 6 | 14.09 | 6.02 | 1.62 | 63.88 | 44.88 | −22.09 |
| 7 | 1847.02 | 47.82 | | | 45.89 | 6.28 |
| Image plane | Infinite | | | | 48.88 | 0 |

Figure 11:
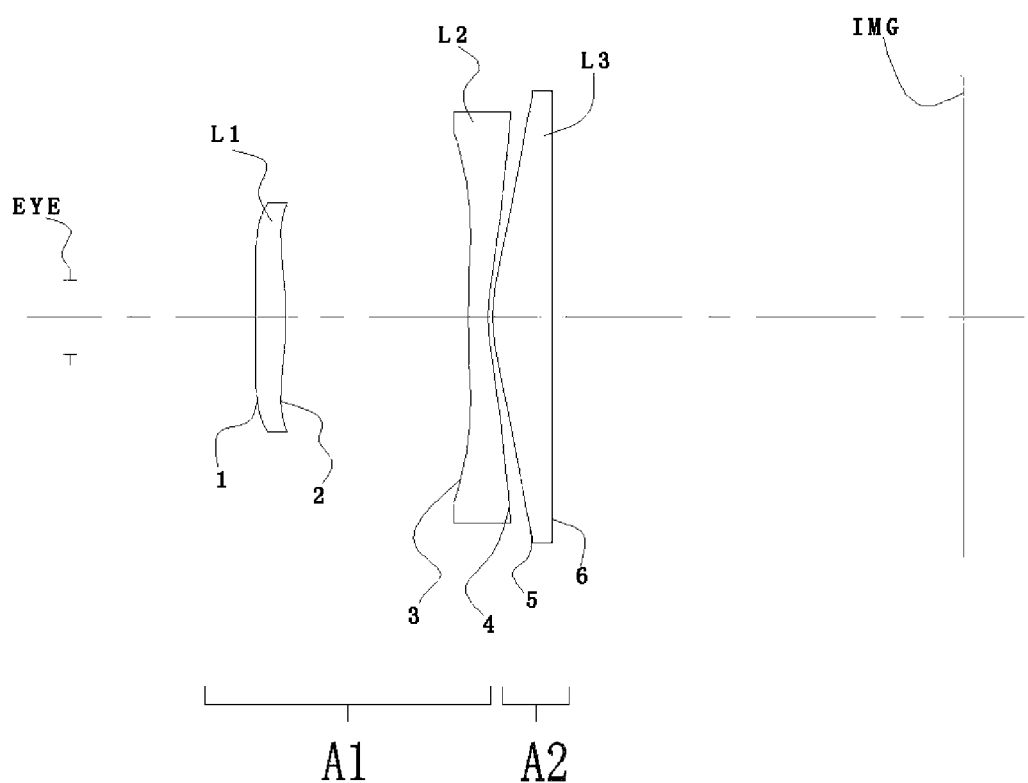
FIG. 11 is a schematic structural diagram of an eyepiece optical system according to Embodiment 3 of the present invention.

FIG. 11 is a 2D structural diagram of an eyepiece optical system according to Embodiment 3. Compared with Embodiment 1 and Embodiment 2, the main characteristic of Embodiment 3 is that the optical structure is composed of three optical lenses. A first lens group A1 is composed of a first lens L1 and a second lens L2, the first lens L1 is a positive lens, and the second lens L2 is a negative lens. Surface shapes of a first optical surface 1 and a fourth optical surface 4 are even-order aspherical surface shapes convex toward the human eye. Surface shapes of a second optical surface 2 and a third optical surface 3 are even-order aspherical surfaces concave toward the human eye. A Fresnel lens in a second lens group A2 is a third lens L3, a fifth optical surface 5 is an even-order aspherical surface, and a sixth optical surface 6 is a Fresnel surface. The focal length of the Fresnel lens is F4, the clear aperture of the Fresnel surface is D4, the total focal length of the optical structure is F, and the distance from the sixth optical surface to the micro display device is fd. |F4/F| is 0.3787, |D4/F4| is 2.0, and fd/F is 0.791.

Figure 12:
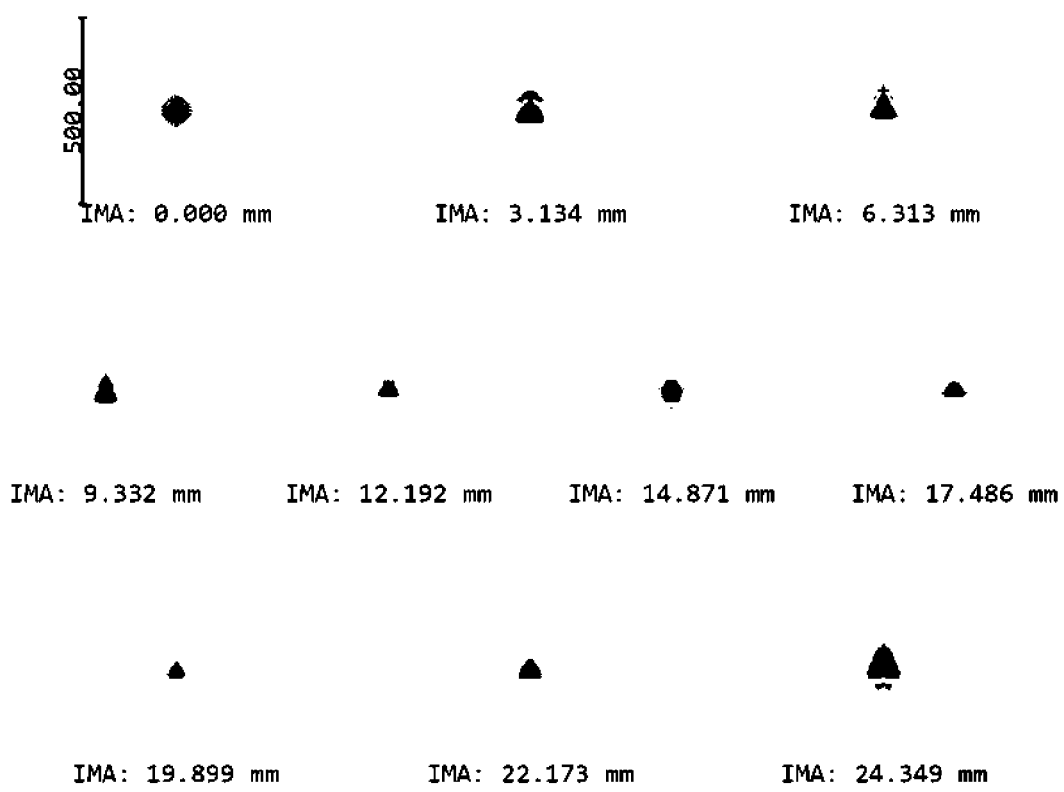
FIG. 12 is a schematic diagram of a dispersion spot array of the eyepiece optical system according to Embodiment 3 of the present invention.
Figure 13:
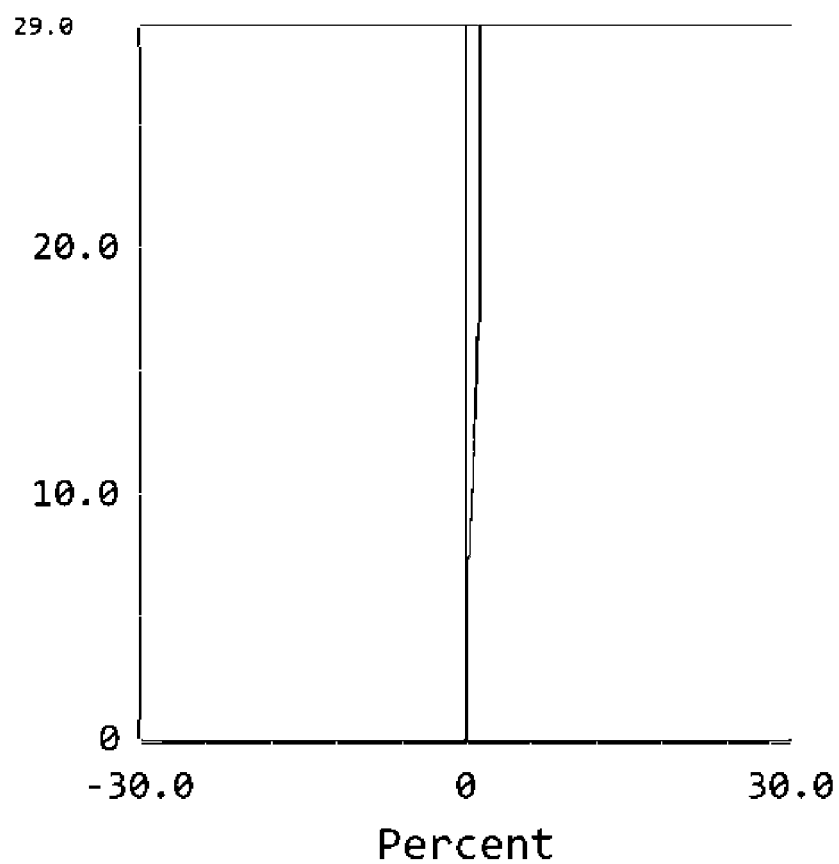
FIG. 13 is a schematic diagram of distortion of the eyepiece optical system according to Embodiment 3 of the present invention.
Figure 14:
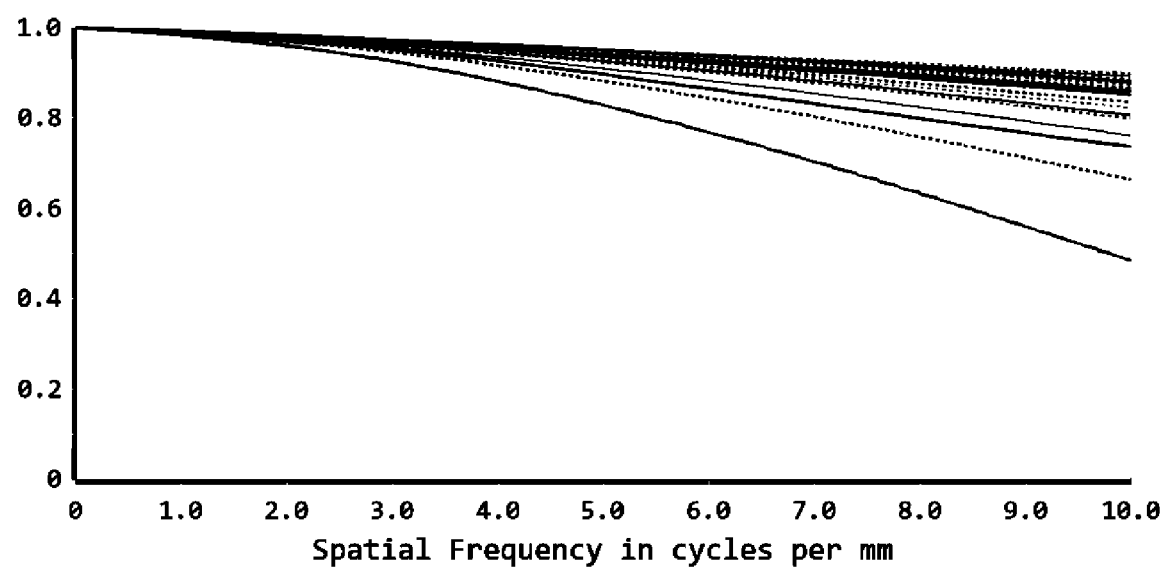
FIG. 14 is a schematic diagram of an MTF of the eyepiece optical system according to Embodiment 3 of the present invention.

FIG. 12, FIG. 13, and FIG. 14 are respectively a dispersion spot array diagram, a distortion diagram, and an MTF diagram of the optical system, reflecting that the light of each field of view of this embodiment in the unit pixel of an image plane (a display device I) has a high resolution and small optical distortion. The resolution per 10 mm per unit period is above 0.50, the aberration of the optical system is well corrected, and a displayed image with uniform and high optical performance can be observed through the eyepiece optical system.

Embodiment 4

Figure 15:
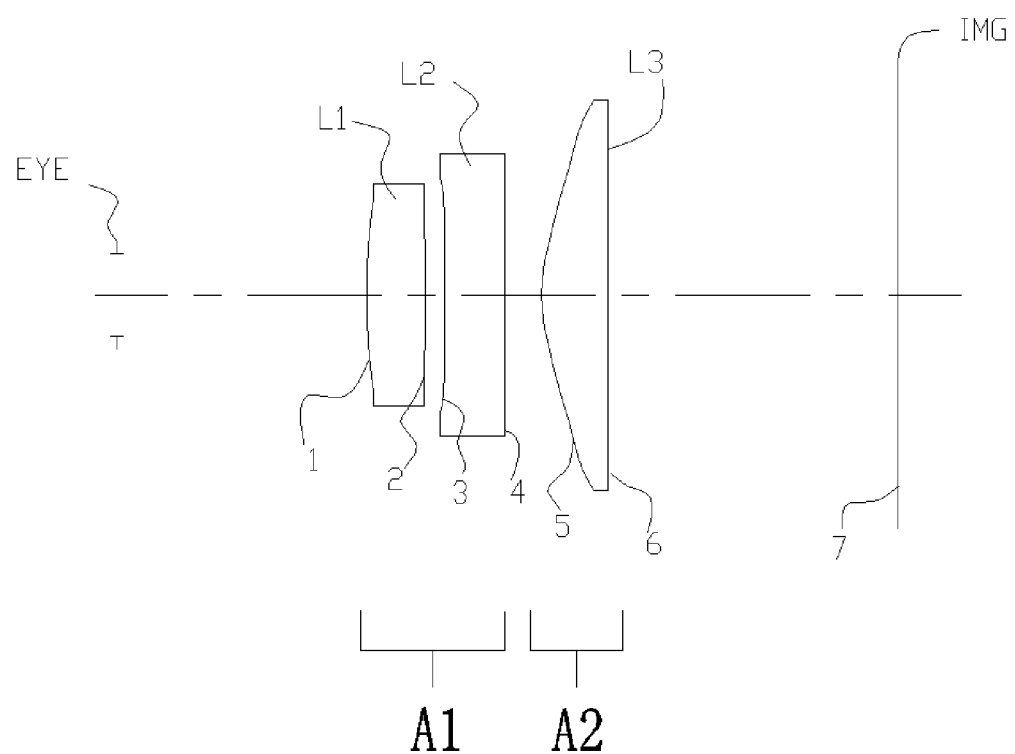
FIG. 15 is a schematic structural diagram of an eyepiece optical system according to Embodiment 4 of the present invention.

Eyepiece design data of Embodiment 4 is shown in the following table:

FIG. 15 is a 2D structural diagram of an eyepiece optical system according to Embodiment 4. Compared with Embodiment 1, Embodiment 2, and Embodiment 3, the main characteristic of Embodiment 4 is that the optical structure is composed of three optical lenses, and a first lens group A1 includes a Fresnel lens. The first lens group A1 is composed of a first lens L1 and a second lens L2, the first lens L1 is a positive lens, and the second lens L2 is a Fresnel lens. A surface shape of a first optical surface 1 is an even-order aspherical surface shape convex toward the human eye. A surface shape of a second optical surface 2 is a spherical surface concave toward the human eye. A surface shape of a third optical surface 3 is an even-order aspherical surface concave toward the human eye. The Fresnel lens in a second lens group A2 is a third lens L3, a fifth optical surface 5 is an even-order aspherical surface, and a sixth optical surface 6 is a Fresnel surface. The fourth-degree coefficient in parameters of the Fresnel surface of the sixth optical surface 6 is −4.8396642e-05, the sixth-degree coefficient is 9.6819004e-08, the eighth-degree coefficient is −1.60209e-10, and the tenth-degree coefficient is 1.294112e-13. The focal length of the Fresnel lens is F4, the clear aperture of the Fresnel surface is D4, the total focal length of the optical structure is F, and the distance from the sixth optical surface 6 to the micro display device is fd. |F4/F| is 0.472, |D4/F4| is 1.45, and fd/F is 0.93.

Figure 16:
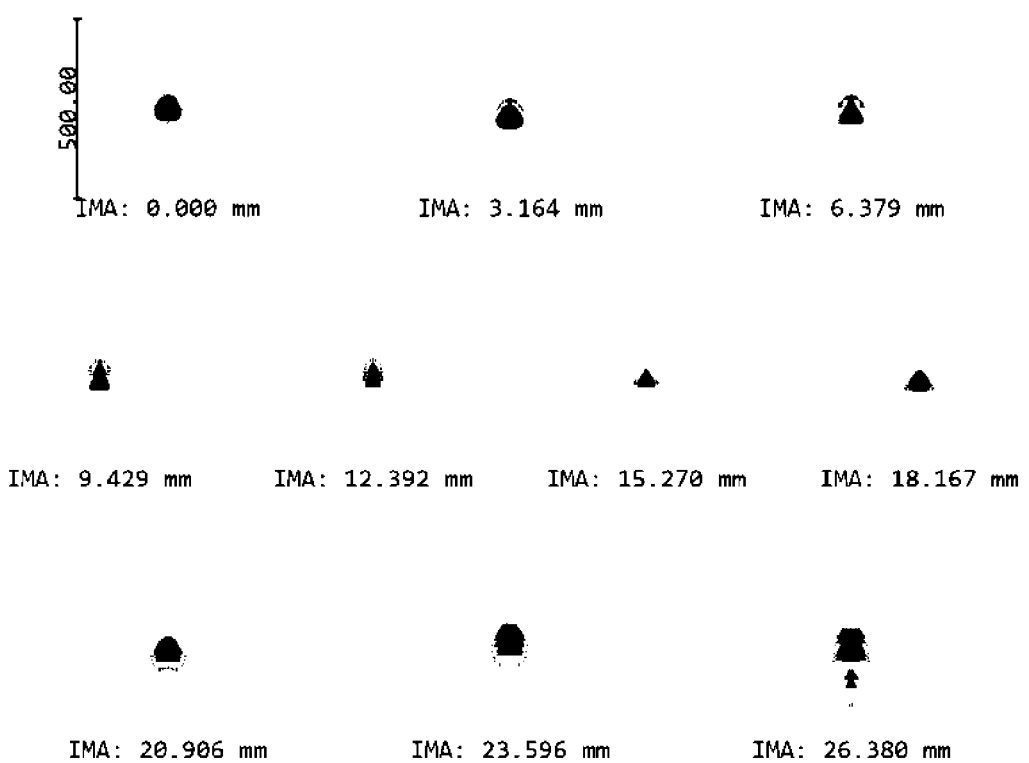
FIG. 16 is a schematic diagram of a dispersion spot array of the eyepiece optical system according to Embodiment 4 of the present invention.
Figure 17:
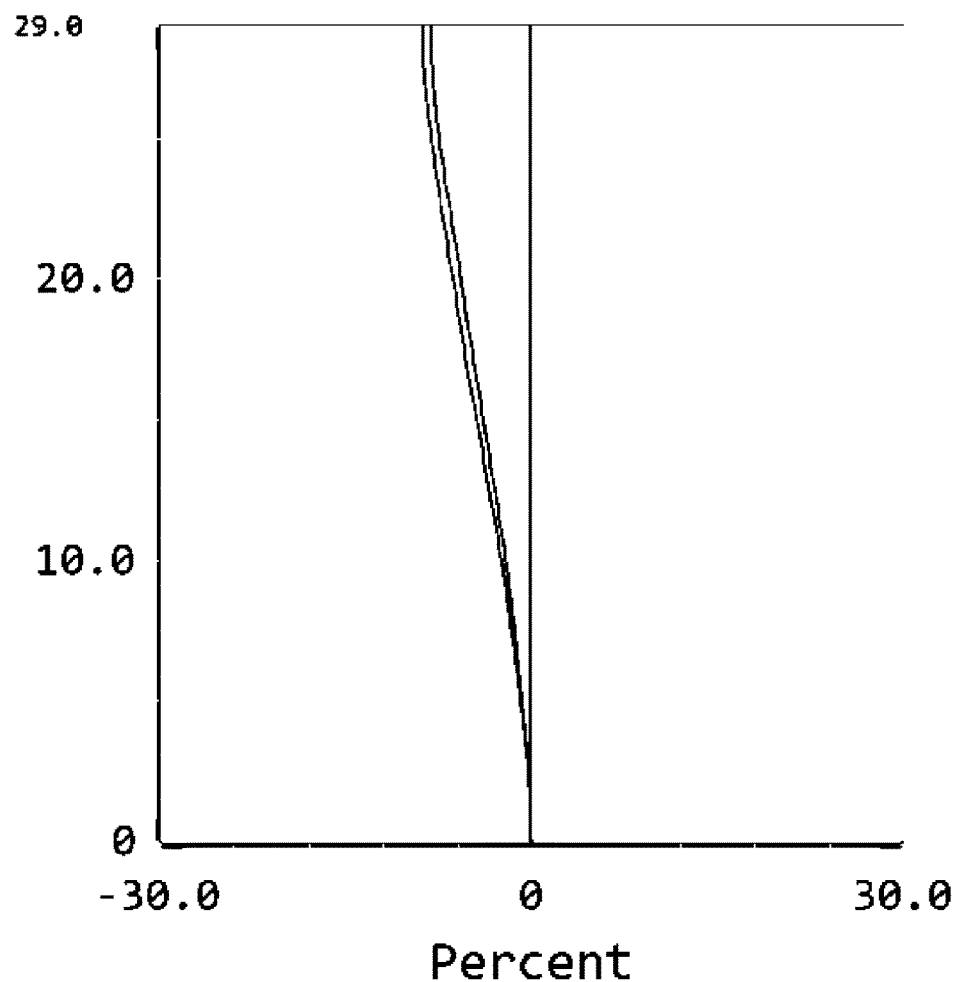
FIG. 17 is a schematic diagram of distortion of the eyepiece optical system according to Embodiment 4 of the present invention.
Figure 18:
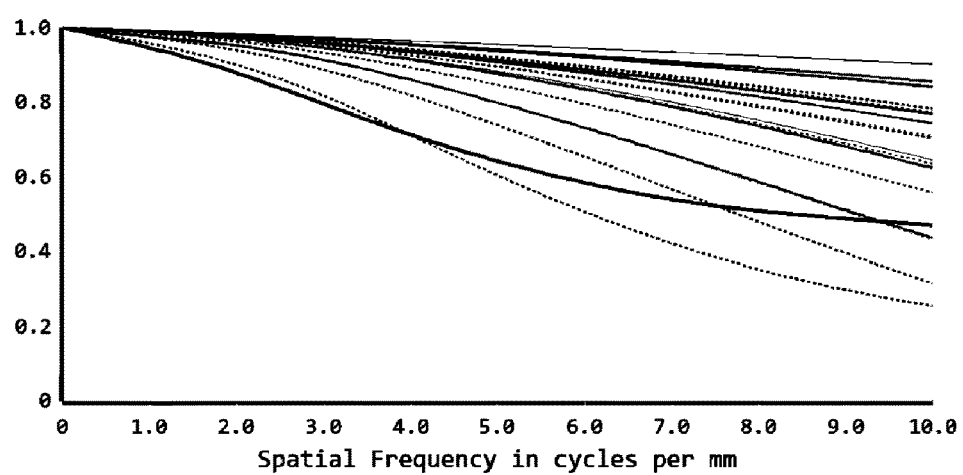
FIG. 18 is a schematic diagram of an MTF of the eyepiece optical system according to Embodiment 4 of the present invention.

FIG. 16, FIG. 17, and FIG. 18 are respectively a dispersion spot array diagram, a distortion diagram, and an MTF diagram of the optical system, reflecting that the light of each field of view of this embodiment in the unit pixel of an image plane (a display device I) has a high resolution and small optical distortion. The resolution per 10 mm per unit

TABLE 5

Eyepiece Design Data of Embodiment 4

| Surface | Curvature radius (mm) | Thickness (mm) | Glass Refractive index | Abbe number | Net caliber (mm) | Cone coefficient |
|---|---|---|---|---|---|---|
| Diaphragm | Infinite | 13.00 | | | 4.00 | |
| 2 | 65.89 | 5.32 | 1.51 | 56.21 | 17.79 | 4.09 |
| 3 | −1383.99 | 1.82 | | | 20.42 | |
| 4 | 631.01 | 5.51 | 1.64 | 22.41 | 21.73 | 18.78 |
| 5 | 19.27 | 3.38 | | | 25.97 | −30.00 |
| 6 | 14.36 | 6.06 | 1.51 | 57.50 | 36.00 | −9.92 |
| 7 | −96.06 | 49.00 | | | 33.82 | 17.45 |
| Image plane | Infinite | | | | 52.80 | | period is above 0.30, the aberration of the optical system is well corrected, and a displayed image with uniform and high optical performance can be observed through the eyepiece optical system.

Embodiment 5

Eyepiece design data of Embodiment 5 is shown in the following table:

TABLE 6

Eyepiece Design Data of Embodiment 5

| Surface | Curvature radius (mm) | Thickness (mm) | Glass Refractive index | Abbe number | Net caliber (mm) | Cone coefficient |
|---|---|---|---|---|---|---|
| Diaphragm | Infinite | 14 | | | 6 | |
| 3 | −1549.68 | 7.00 | 1.56 | 60.79 | 19.39 | |
| 4 | −151.10 | 4.46 | | | 23.01 | 114.67 |
| 5 | 46.72 | 3.02 | 1.64 | 22.41 | 28.01 | −4.81 |
| 6 | 27.20 | 0.18 | | | 29.51 | −2.81 |
| 7 | 24.60 | 6.49 | 1.53 | 55.80 | 29.51 | −3.72 |
| 8 | −376.59 | 14.59 | | | 30.64 | |
| 9 | −55.94 | 7.00 | 1.53 | 55.80 | 38.83 | −5.31 |
| 10 | −50.14 | 35.61 | | | 46.68 | 0.55 |
| Image plane | Infinite | | | | 56.58 | |

Figure 19:
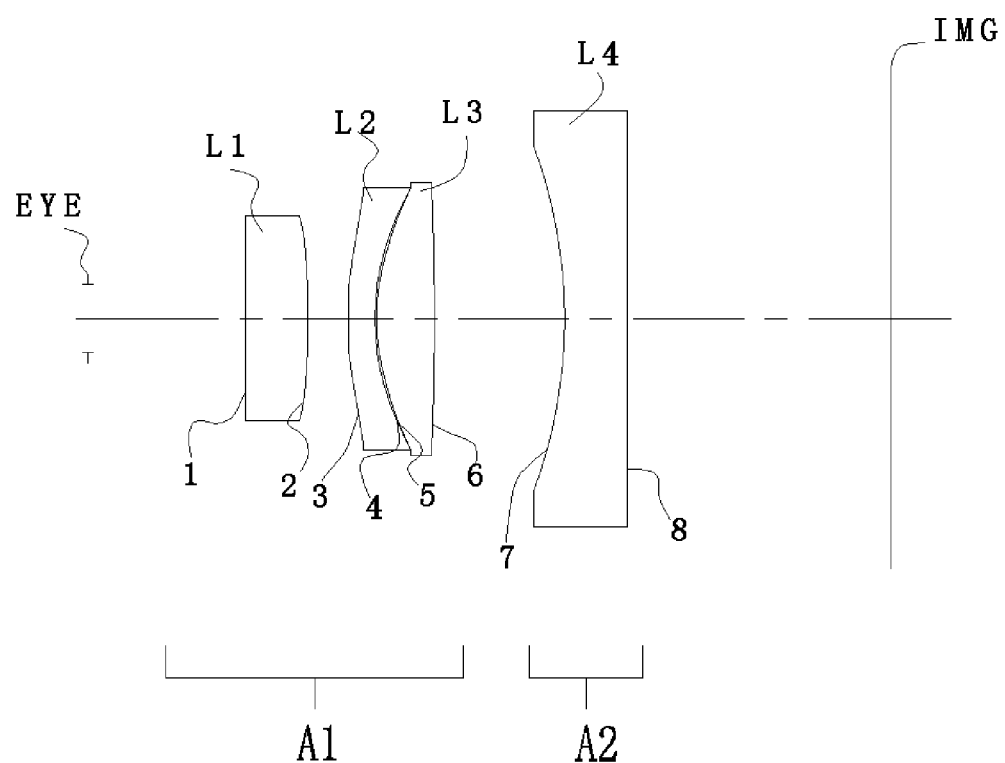
FIG. 19 is a schematic structural diagram of an eyepiece optical system according to Embodiment 5 of the present invention.

FIG. 19 is a 2D structural diagram of an eyepiece optical system according to Embodiment 5. Compared with other embodiments, the main characteristic of Embodiment 5 is that the optical structure is composed of four optical lenses. A first lens group A1 is composed of a first lens L1, a second lens L2, and a third lens L3, the first lens L1 and the third lens L3 are positive lenses, and the second lens L2 is a negative lens. A surface shape of a first optical surface 1 is a spherical surface shape convex toward the human eye. Surface shapes of a third optical surface 3, a fourth optical surface 4, and a fifth optical surface 5 are even-order aspherical surface shapes convex toward the human eye. Surface shapes of a second optical surface 2 and a sixth optical surface 6 are even-order aspherical surface shapes concave toward the human eye. The Fresnel optical lens in a second lens group A2 is L4, a seventh optical surface 7 is an even-order aspherical surface, and an eighth optical surface 8 is a Fresnel surface. The fourth-degree coefficient in parameters of the Fresnel surface of the eighth optical surface 8 is −1.6683367e-06, the sixth-degree coefficient is 1.3777189e-10, the eighth-degree coefficient is −1.2996377e-11, and the tenth-degree coefficient is 6.9607322e-15. The focal length of the Fresnel lens is F4, the clear aperture of the Fresnel surface is D4, the total focal length of the optical structure is F, and the distance from the sixth optical surface 6 to the micro display device is fd. |F4/F| is 10.61, |D4/F4| is 0.073, and fd/F is 0.62.

Figure 20:
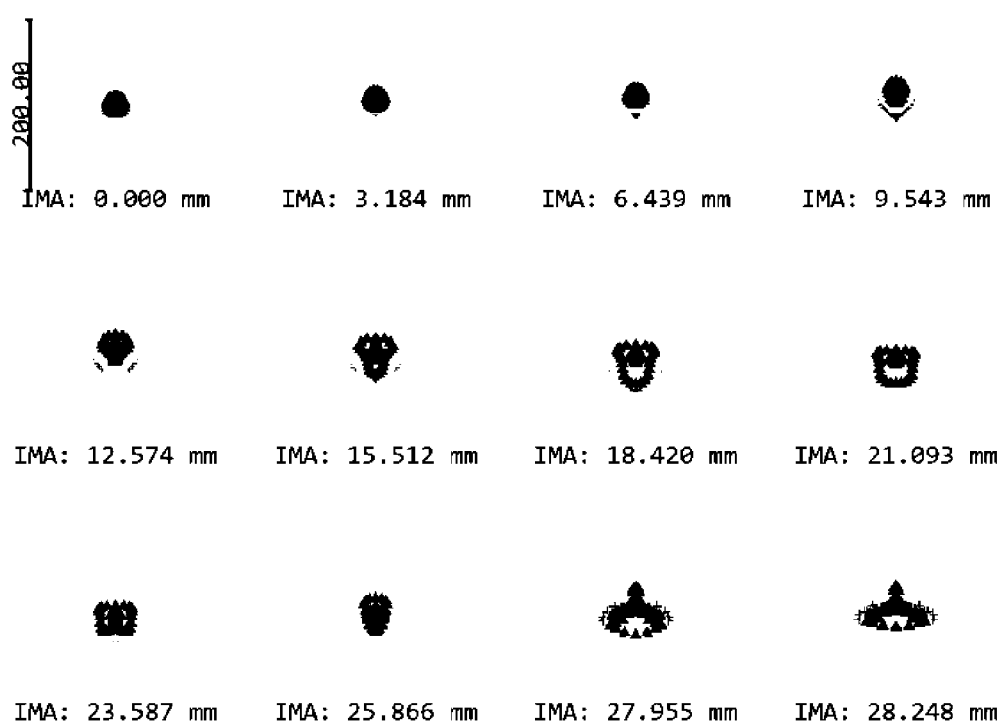
FIG. 20 is a schematic diagram of a dispersion spot array of the eyepiece optical system according to Embodiment 5 of the present invention.
Figure 21:
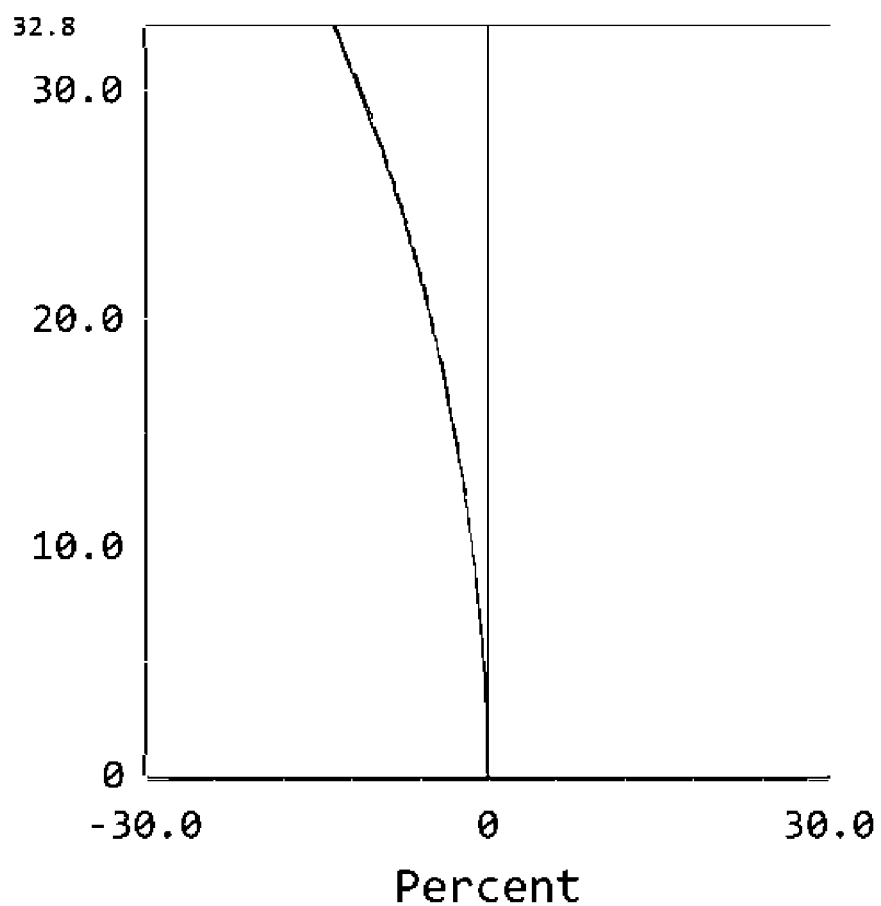
FIG. 21 is a schematic diagram of distortion of the eyepiece optical system according to Embodiment 5 of the present invention.
Figure 22:
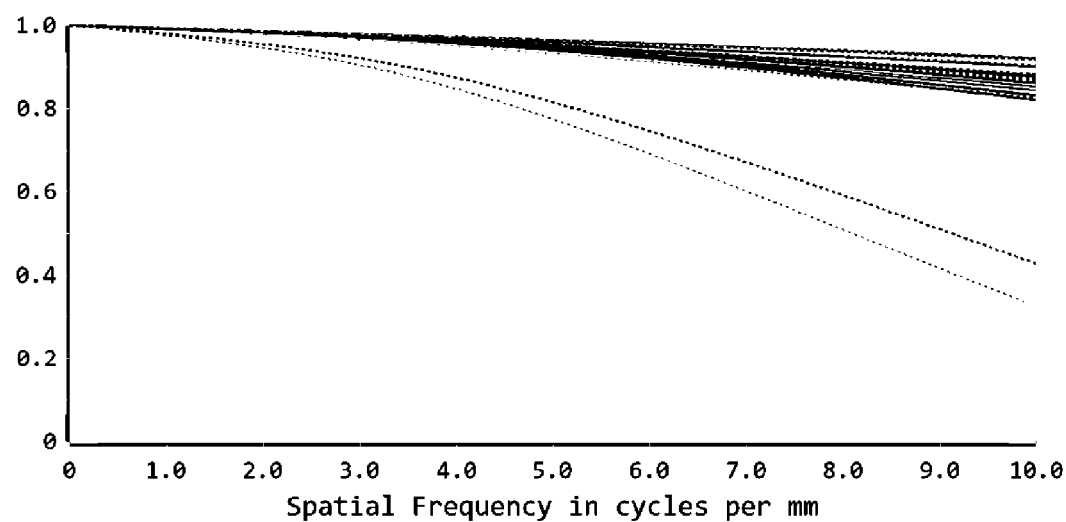
FIG. 22 is a schematic diagram of an MTF of the eyepiece optical system according to Embodiment 5 of the present invention.

FIG. 20, FIG. 21, and FIG. 22 are respectively a dispersion spot array diagram, a distortion diagram, and an MTF diagram of the optical system, reflecting that the light of each field of view of this embodiment in the unit pixel of an image plane (a display device I) has a high resolution and small optical distortion. The resolution per 10 mm per unit period is above 0.50, the aberration of the optical system is well corrected, and a displayed image with uniform and high optical performance can be observed through the eyepiece optical system.

All the data of the above Embodiment 1 to Embodiment 5 meet parameter requirements recorded in Summary of the invention, and results are shown in Table 7 below:

TABLE 7

Various Items of Data of Embodiment 1 to Embodiment 5

| | F4/F | D4/F4 | fd/F |
|---|---|---|---|
| Embodiment 1 | 1.193 | 1.425 | 0.605 |
| Embodiment 2 | 0.3479 | 1.993 | 0.941 |
| Embodiment 3 | 0.3787 | 2.0 | 0.791 |

TABLE 7-continued

Various Items of Data of Embodiment 1 to Embodiment 5

| | F4/F | D4/F4 | fd/F |
|---|---|---|---|
| Embodiment 4 | 0.472 | 1.45 | 0.93 |
| Embodiment 5 | 10.61 | 0.073 | 0.62 |

In another embodiment, an eyepiece optical device with a large field-of-view angle and high image quality is further provided in the present invention. The eyepiece optical device includes two micro display devices corresponding to positions of left and right eyes of a human, respectively, and further includes the optical system in the above description. The optical system is arranged at a position between the human eye and the micro display device, which fully corrects the aberration of the system through a combination of various positive and negative lenses of a first lens group A1 and a Fresnel lens A2, and adopts a first lens L1 that is concave toward the human eye and a Fresnel lens that can provide enough positive focal power, for projecting an image displayed by the micro display device into the human eye with the characteristics of high image quality, low distortion, and large field-of-view angle. An observer can watch large images of full frame, high definition and uniform image quality without any distortion and get visual experience of high liveness via the eyepiece optical system. The micro display device is an organic electroluminescence device or a transmissive liquid crystal display It should be understood that, for those of ordinary skill in the art, improvements or changes can be made according to the above description, and all such improvements and changes shall fall into the protection scope of the attached claims of the present invention.

What is claimed is:

1. An eyepiece optical system with a large field-of-view angle and high image quality, comprising a first lens group and a second lens group arranged successively along an optical axis from a human eye observing side to a micro display, wherein the first lens group is composed of one or more lenses, the second lens group comprises a Fresnel lens, and the Fresnel lens comprises a Fresnel surface;

a range of the Fresnel surface from the center to the edge can be divided into N sections, wherein the frequency in the $n^{th}$ section is fn, and N and n meet the following relations (1) and (2):

$$N \geq 1 \qquad (1);$$

$$1 \leq n \leq N \qquad (2);$$

the focal length of the Fresnel lens is F4, the total focal length of the optical system is F, and F4 and F meet the following relationship (3):

$$0.3 \leq |F4/F| \qquad (3).$$

2. The eyepiece optical system according to claim 1, wherein the clear aperture of the Fresnel lens is D4, and D4 and F4 meet the following relationship (4):

$$|D4/F4| \leq 2.5 \qquad (4).$$

3. The eyepiece optical system according to claim 1, wherein the distance from an optical surface of one side of the Fresnel lens close to the micro display to the micro display is fd, and fd and F meet the following relationship (5):

$$0.05 \leq fd/F \leq 1.0 \qquad (5).$$

4. The eyepiece optical system according to claim 1, wherein the F4 and F further meet the following relation (6):

$$0.3455 \leq |F4/F| \qquad (6).$$

5. The eyepiece optical system according to claim 2, wherein the D4 and F4 further meet the following relation (7):

$$|D4/F4| \leq 2.05 \qquad (7).$$

6. The eyepiece optical system according to claim 3, wherein the fd and F further meet the following relation (8):

$$0.095 \leq fd/F \leq 0.89 \qquad (8).$$

7. The eyepiece optical system according to claim 1, wherein lenses of the first lens group and the second lens group are made of glass materials or plastic materials.

8. The eyepiece optical system according to claim 1, wherein the Fresnel lens further comprises a common optical surface, and the common optical surface is in a plane, spherical, or aspherical surface shape.

9. The eyepiece optical system according to claim 1, wherein the surface shape of each lens in the first lens group is a spherical surface shape, an even-order aspherical surface shape, or a Fresnel surface shape, and there is at least one axisymmetric aspherical lens in the first lens group and the second lens group.

10. An eyepiece optical device with a large field-of-view angle and high image quality, comprising two micro display devices corresponding to positions of left and right eyes of a human, respectively, and further comprising the optical system according to claim 1, wherein the optical system is arranged at a position between the human eye and the micro display device, for projecting a picture displayed by the micro display device into the human eye with the characteristics of high image quality, low distortion, and large field-of-view angle.

* * * * *